Oct. 11, 1927.                                                                1,644,752
V. F. SLEZAK
ACTUATING MECHANISM FOR COIN CONTROLLED, TICKET
PRINTING WEIGHING SCALES
Filed Sept. 15, 1926                  2 Sheets-Sheet 1
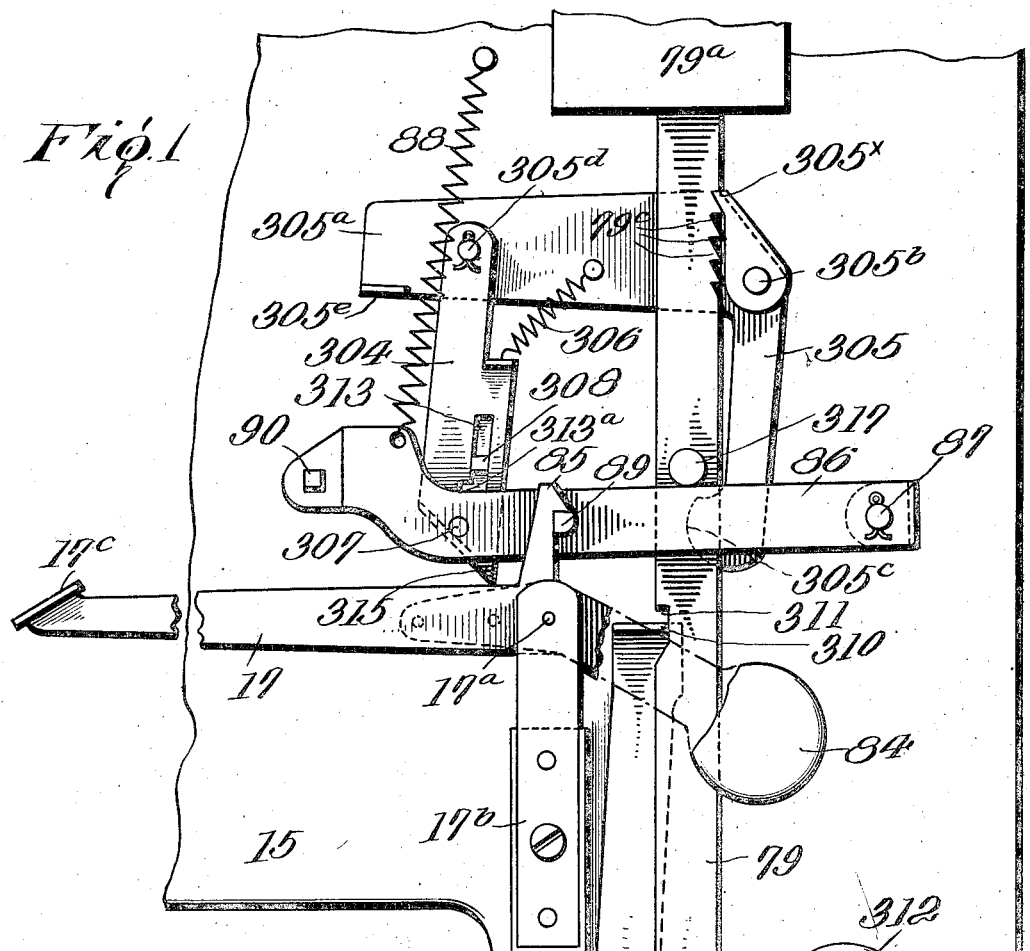
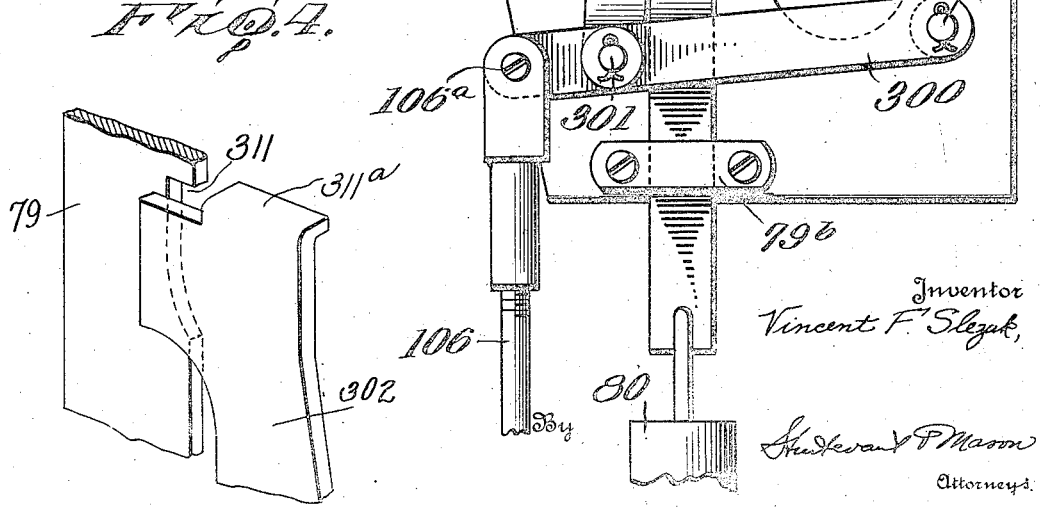
Inventor
Vincent F. Slezak,
By Sturtevant & Mason
Attorneys

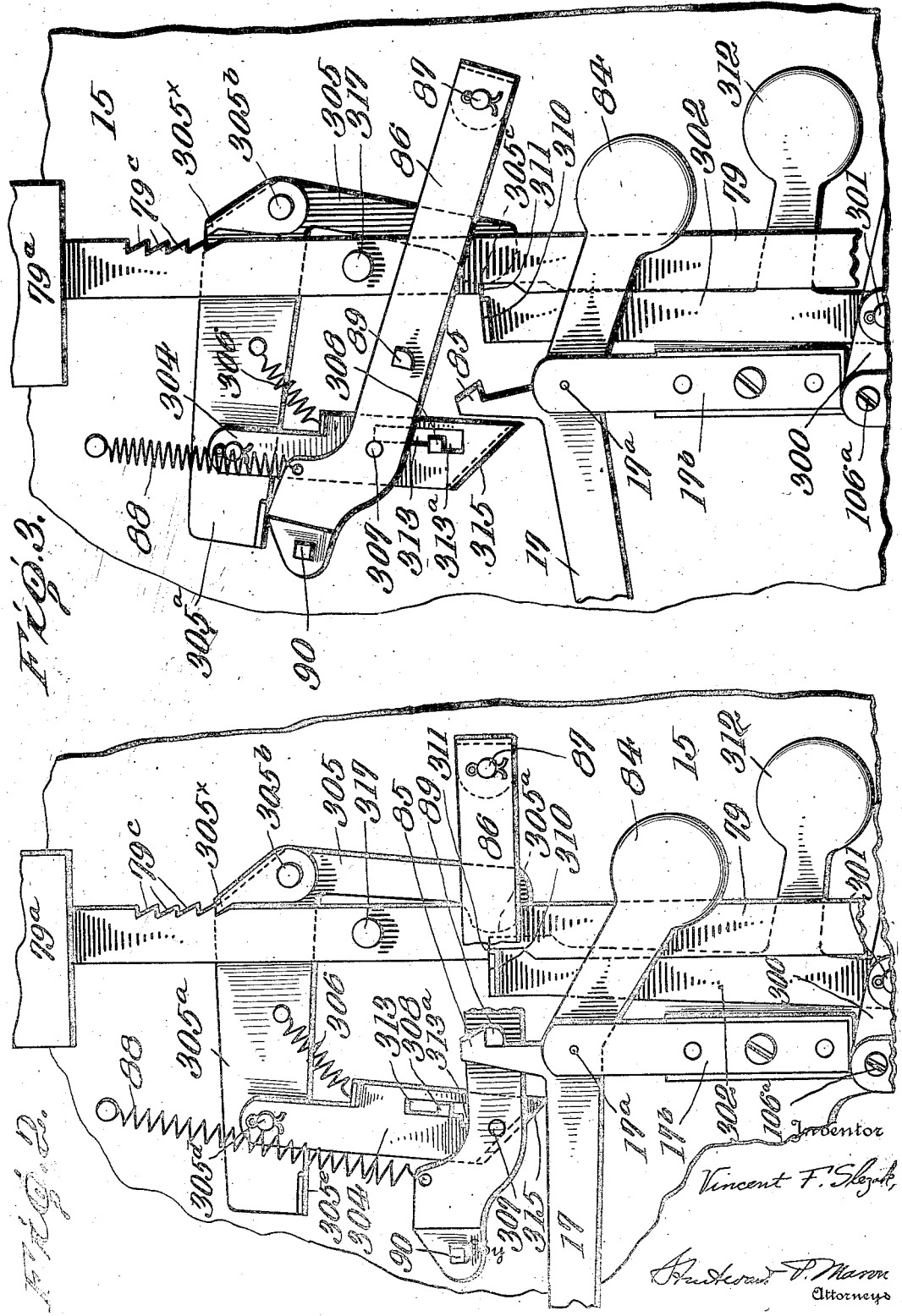

Patented Oct. 11, 1927.

1,644,752

UNITED STATES PATENT OFFICE.

VINCENT F. SLEZAK, OF CHICAGO, ILLINOIS, ASSIGNOR, BY MESNE ASSIGNMENTS, TO THE AMERICAN TICKET SCALE COMPANY, OF CHICAGO, ILLINOIS, A CORPORATION OF ILLINOIS.

ACTUATING MECHANISM FOR COIN-CONTROLLED, TICKET-PRINTING WEIGHING SCALES.

Application filed September 15, 1926. Serial No. 135,605.

This invention relates to improvements in automatic weighing machines.

In my copending application Serial No. 97,034, filed March 24, 1926, now U. S. Letters Patent 1,610,893, granted Dec. 14, 1926, there is disclosed an automatic weighing machine which is of the coin-controlled type with a printing mechanism associated therewith. In it, the mass superimposed upon the weighing platform is caused to effect a storage of power, and thereafter to deliver an indication of its own weight, whereupon the power stored up in the system is released to actuate a printing mechanism, so that a printed indication of the weight is delivered from the machine.

The present invention concerns certain improvements therein, and more particularly, the method of storing power in such a machine, and releasing such power to accomplish the aforesaid result.

One of the features of this invention is the provision of an apparatus in which the power storing system is substantially free and independent of the platform mechanism except at the first superimposition of a weight thereon following a release of such power storing mechanism, so that the power storing mechanism may be retained by proper means in a stored position, irrespective of any movements of the scale platform after such initial storing.

Another feature of this invention is the provision of means whereby undue wear and exhaustion to the mechanism may be eliminated, which might arise by the placing of weights upon the platform, and then removing them therefrom. As a result of such practice, in several types of machines heretofore proposed, the ticket magazine was successively actuated or "pumped" so that a plurality of tickets were delivered without prepayment, although without printed indications of weight. Further, the repeated partial lifting and lowering was disadvantageous as tending to wear out the elements.

Another feature of this invention is a simplification of the power storing mechanism and its releasing system.

On the accompanying drawings:

Fig. 1 is a diagrammatic view of the power storing mechanism and its associated parts in the "non-storage" position.

Fig. 2 is a similar view of the elements in the "storage" position.

Fig. 3 is a similar view with the parts in the release position.

Fig. 4 is a perspective view showing the relationship of the detent and the plunger.

In the machine according to my copending application, to which reference is made for the further details of the operation and assemblage, and in which corresponding reference characters are employed, a scale platform is provided upon which a person may stand or a weight be imposed. As the result of a mass being superimposed upon the scale platform, the latter is caused to successively energize two members; first, a power storage member, and secondly, a weight indicating member. As a result of the actuation of the power storage member, energy is stored up within the mechanism. The weight indicating member thereafter indicates the weight superimposed upon the platform. If a coin be now deposited in the machine according to my aforesaid application, this energy is released and is caused successively to effect a printing of the aforesaid weight indication, and a delivery of the printed ticket from the machine. When the weight of the person or article is removed from the platform, all the elements are restored to their initial position, so that when another weight is placed upon the platform, power is again stored, etc.

It will be understood that in such mechanisms, it is customary to set a minimum of around twenty pounds, below which the machine will not indicate: and to provide that any weight above the minimum shall set the actuating mechanism and store the requisite energy for coin-controlled operation. According to this invention, a much lower weight will cause a partial storage, without a permissive return thereafter.

According to this invention, the power storing member 106 is caused to move upwardly as set forth in my copending application when a weight is brought upon the platform.

The power storing thrust rod 106 is pivotally connected at 106ª to a rocking guide lever 300 which is pivotally supported at 309 on the frame of the machine, and serves to guide the upper end of the thrust rod 106 during its movement. At an intermediate point of the lever 300 is a pivot 301 of a detent 302, which has a weight 312 located well to the right of its pivot, in the position shown in the drawings, so that this detent 302 is constantly urged by gravity in a clockwise direction. At its upper end the detent 302 has a laterally bent thrust flange 310.

The power storage plunger 79 is guided for movement back and forth with respect to the frame 15 by the clip members 79ª and 79ᵇ which are secured to the frame at appropriate points.

A series of teeth 79ᶜ are formed on the edge of the weight storage plunger 79.

A pin 317 on the plunger 79 serves during the downward movement of the plunger to engage with the upper edge of the swinging lever 86 and move the latter downward against the action of its spring 88. The notch 311 in the side of plunger 79 cooperates with the flange 310 on the detent 302, so that the latter can raise the plunger: it is preferred to extend the detent 302 beyond the flange as shown in dotted lines; to serve as a guide 311ª even in the outward position of the detent. At its lower end, the plunger 79 has a device which constantly tends to urge the rod into its lowermost position, which is represented as the weight 80.

The swinging lever 86 is mounted on a pivot 87 of the frame. This swinging lever has the spring 88 connected to it and to the frame, and constantly urges the left hand end of this lever 86 upward against the action of gravity. A lug 89 on the swinging lever 86 is engaged by the hook 85 of the coin lever 17: this coin lever is pivoted at 17ª on a bracket 17ᵇ secured to the frame, and extends across the frame and has at its left hand end a coin plate 17ᶜ which is actuated by a coin in its descent through the machine to cause the coin lever 17 to rock in a counterclockwise direction, whereby to release the hook 85 from the lug 89. The counterweight 84 at the right hand end of the coin lever 17 serves to return this lever to its normal position.

The elbow catch 305, 305ª is pivoted to the frame at 305ᵇ, and at the end of its downwardly directed arm 305 has a finger 305ᶜ which is presented opposite the end 310 of the detent 302 in the raised position of the latter, for a purpose to be described hereinafter. A pawl lug 305ˣ is rigidly mounted on the angle catch 305, for engagement in the teeth 79ᶜ of the plunger 79. On its horizontal arm 305ª, is a pivot 305ᵈ for a guide lever 304: this guide lever 304 is constantly urged in a counterclockwise position about its pivot 305ᵈ by a spring 306. A slot 313 in this guide lever fits about a lug 308 on the frame, whereby the movement of the guide lever 304 is circumscribed: at its lower end this slot 313 has an offset recess 313ª. At the lower end of the guide lever 304 is an inclined laterally directed cam flange 315. A pin 307 projecting laterally from the swinging lever 86 is in operative relation with the cam flange 315 on the guide lever 304, and serves to rock the latter in a clockwise direction against the action of its spring 306.

The method of operation of the device is as follows:

When a weight is placed upon a platform of the scale, the thrust rod 106 is caused to move upward as set forth in my aforesaid copending application, whereby the detent 302 is raised by its lever 300. Since the detent 302 is constantly urged toward the right at its upper end by the counterweight 312, it engages in the notch 311 of the plunger 79, and rests against the shoulder forming the upper wall of this notch, and raises the plunger 79 and therewith the weight 80 suspended therefrom. The angle catch 305 presses its pawl 305ˣ against the successive teeth as they pass, and will lock the plunger 79 at substantially the height at which it has been raised. If the weight is then removed from the platform without the coin control actuation to be described hereinafter, the plunger 79 will remain at substantially the height at which it has been raised, and the thrust rod 106, the lever 300 and detent 302 will move downwardly again, as set forth in my copending application, without causing a downward movement of the plunger 79 therewith, no matter how slight be the amount by which it has been raised.

If weight is again placed upon the platform the thrust rod 106 will again raise the detent 302, and with a sufficient weight will bring it into the position shown in Fig. 2, in which the thrust rod 79 has been raised to its uppermost position, and is held therein by the pawl 305ˣ.

If in this uppermost position, which will hereinafter be termed the "storage" position, a coin is deposited in the machine, this coin will move downward therein and strike against the coin plate 17ᶜ, and cause the coin lever 17 to move counterclockwise, and withdraw its hook 85 from the lug 89. The swinging lever 86 is now free to move in a clockwise direction about its pivot 87, under the action of its spring 88. The lug 90 then causes the release of the spring held printing hammer, as described in my copending application; and the swinging plates 86 continues to rock upwardly until it engages the plate 305ᵉ on the horizontal arm 305ª of the angle catch and rocks this angle catch about its pivot 305ᵇ until the pawl 305ˣ is released from the teeth 79ᶜ. At the same time the finger 305ᶜ of the angle catch 305 strikes against the upper end of the detent 302 and holds the flange 310 of the latter out of the position in which it engages with the shoulder at the upper end of the notch 311. The guide lever 304 in its upward movement with the horizontal arm 305ᵃ of the anchor catch, moves along the guide lug 308 until its spring 306 causes it to move slightly in a counterclockwise direction and seat itself above this guide lug, as shown in Fig. 3, after which the guide lever 304 and the angle catch cannot be moved except as described hereinafter.

The plunger 79 and its weight 80 are now free to move downward, and execute this movement, and therewith develop the necessary power for the restoring of the printing hammer and for the severing operation as set forth in my copending application, to which reference is made for these details of the operation of the mechanism.

During its downward movement, the latch 79 brings its pin 317 against the upper surface of the swinging lever 86, and moves this lever in a counterclockwise direction about its pivot 87 and against the action of its spring 88, until it strikes against the inclined upper surface of the hook 85, and by rocking this hook and the coin lever 17, presents its lug 89 in position to be locked by this hook 85. During this movement the pin 307 on the swinging lever 86 comes into contact with the cam flange 315 on the guide lever 304 and causes this guide lever to rock slightly in a clockwise direction about its pivot 305ᵈ. The weight of the horizontal arm 305ᵃ of the angle catch then causes the angle catch to rock about its pivot, and to force the guide lever 304 downward. During this rocking movement of the angle catch, its surface 305ᶜ is withdrawn from the detent 302, so that the latter is again permitted to rest against the plunger 79: and at the same time the pawl 305ˣ is permitted to rest against the other side of the plunger 79. In this way, all of the elements are restored to their initial position and are ready for a new actuation.

Having thus described the invention, what I claim as new and desire to secure by Letters Patent, is—

1. In a coin-controlled power-storing weighing scale having a platform actuable by the weight to be measured, a plunger, means to draw said plunger into one end position, means actuated by said platform when a weight is super-imposed thereon to move said plunger in the other direction, a pawl engaging said plunger to hold it in its moved position, a coin-actuated device, means normally retained inactive by said device and released upon actuation thereof to withdraw said pawl from said plunger to liberate the latter for return to its first end position, and a locking device connected with said means to maintain said pawl out of engagement with said plunger until the latter has substantially regained its first end position.

2. In a coin-controlled power-storing weighing scale having a weighing platform actuated by the weight to be measured, a plunger, means actuated by said platform to move said plunger into one end position to store power, a pawl to retain said plunger in its moved position, coin-controlled means to withdraw said pawl from said plunger, and means connected to said pawl to disengage said actuating means from said plunger when said pawl is withdrawn therefrom.

3. In a coin-controlled power-storage weighing scale having a platform actuated by the weight to be measured, a plunger, a rod reciprocated by said platform in its movements, an actuating finger on said rod to move said plunger out of a first end position toward a second end position, means to return said plunger to said first position, a pawl to hold said plunger in its moved position, and coin-controlled means to move said pawl and finger from engagement with said plunger so that it may return to its first position.

4. In a coin-controlled power-storing weighing scale having a platform actuated by the weight to be measured and including a printing mechanism, a plunger, means actuated by said platform to move said plunger from a first end position whereby to store power, means to return said plunger to said first position whereby to develop power, a pawl to hold said plunger in its moved position, a coin-controlled device to withdraw said pawl and actuating means from said plunger to permit its return whereby to deliver power to operate said printing mechanism, and means controlled by said plunger to prevent the reengagement of said pawl until said plunger has substantially regained said first position.

5. In a coin-controlled power-storing weighing scale having a platform actuated by the weight to be measured, a plunger, means operated by said platform to move said plunger from a first end position, a pawl to hold said plunger in its moved position, means rigid with said pawl to disengage said moving means from said plunger, and coin-controlled means to withdraw said pawl from said plunger and simultaneously release said moving means therefrom.

6. In a coin-controlled power-storing weighing scale having a platform actuated by the weight to be measured, a plunger, means operated by said platform to move said plunger from a first end position, a pawl to hold said plunger in its moved position, means rigid with said pawl to disengage said moving means from said plunger, a coin-controlled lever, a swinging plate normally held against movement by said coin lever, means to rock said swinging plate when released by said coin lever, said plate when released disengaging said pawl from said plunger so that the latter can return to the first position, and means on said plunger to restore said swinging plate.

7. In a coin-controlled power-storing weighing scale having a platform actuated by the weight to be measured, a plunger, means operated by said platform to move said plunger from a first end position, a pawl to hold said plunger in its moved position, means rigid with said pawl to disengage said moving means from said plunger, a coin-controlled lever, a swinging plate normally held against movement by said coin lever, means to rock said swinging plate when released by said coin lever, said plate when released disengaging said pawl from said plunger so that the latter can return to its first position, a locking dog to hold said pawl in disengaged position, means on said plunger to restore said swinging plate, and means on said swinging plate to free said dog from said pawl so that the latter may return to engaging relation with said plunger.

8. In a coin-controlled power-storing weighing scale having a platform actuated by the weight to be measured, and a printing mechanism with type moved to printing position by said platform, a plunger, means operated by said platform to move said plunger from a first end position, a pawl to hold said plunger in its moved position, a swinging plate to release said pawl from such holding position, a coin-controlled lever normally retaining said swinging plate against releasing movement, a locking dog to hold said pawl in disengagement from said plunger, said dog moving to locking position upon movement of said pawl into disengaged position, means on said swinging plate to cause actuation of said printing mechanism, a pin on said plunger to restore said swinging plate, a cam on said dog, and means on said plate engaging said cam to unlock said dog and move said pawl into engaging relation with said plunger.

9. In a coin-controlled, power-storing weighing scale having a platform actuatable by the weight to be measured, a power-storage member, means operated by the platform to move said member in one direction to store power, and a device having a coin-actuated releasing means to hold said member in its extreme moved position of power storage, said device coacting with said member to hold the same in substantially any intermediate position to which it is moved by said operating means.

10. In a coin-controlled, power-storing weighing scale having a platform actuatable by the weight to be measured, a power-storage member, means operated by the platform to move said member to store power, a detent to retain said member in substantially any such moved position independently of subsequent movements of said platform, and a coin-controlled device to release said member from said detent and means whereby said member may move to develop power.

In testimony whereof, I affix my signature.

VINCENT F. SLEZAK.